Nov. 23, 1965  R. P. LITTLE  3,219,369
VACUUM FLANGE WITH ALTERNATE SEAL RECEIVING MEANS
Filed June 27, 1963

INVENTOR
ROBERT P. LITTLE
BY
ATTORNEY

3,219,369
VACUUM FLANGE WITH ALTERNATE SEAL RECEIVING MEANS

Robert P. Little, Oxon Hill, Md.
(5509 Fenwood Ave., Washington 21, D.C.)
Filed June 27, 1963, Ser. No. 291,222
4 Claims. (Cl. 285—363)
(Granted under Title 35, U.S. Code (1952), sec. 266)

The invention described herein may be manufactured and used by or for the Government of the United States of America for governmental purposes without the payment of any royalties thereon or therefor.

The present invention relates generally to flanged conduit connections and more particularly to a versatile vacuum flange adapted for use in both baked and unbaked vacuum systems.

In the assembly, disassembly and testing of vacuum systems it is well known that conventional rubber, Viton or Teflon O-rings cannot be used to seal the various connections where it is contemplated or where the possibility exists that the system will be baked at several hundred degrees centigrade to produce extreme vacuum conditions. It is common practice therefore to use copper or aluminum sealing rings to produce shear seal connections of the type described in U.S. Patent 2,922,666. Although the metal shear seal connection provides an excellent seal for both baked and non-baked systems the very nature of these systems generally requires repeated assembly and disassembly during the necessary leak checking required prior to the operation of the system for its intended purposes. Since a proper metal shear seal connection requires that the originally washer-shaped sealing ring be substantially deformed, these rings are not reusable and easily as many as a dozen such rings may be expended in the leak testing of a system prior to the operational use thereof.

The present invention permits the use of reusable rubber or Teflon O-rings during the preliminary testing of the above-described systems thus eliminating the destruction of numerous metal sealing rings with provisions for employing a metal sealing ring for the final seal thus providing a bakable flange connection when the system is placed in actual use. The versatile vacuum flange of the present invention will further permit the use of conventional Teflon or rubber O-rings as the sealing element for final sealing when the system is not to be baked.

The versatile vacuum flange of the present invention employs a pair of complementary flange body members which when secured together provide a pair of coacting sealing ring seats which may accommodate either a washer-shaped metal sealing ring or a convention O-ring of Teflon or rubber as the intended use or stage of operation dictates.

It is an object of the present invention to provide a vacuum flange capable of receiving either metal or rubber sealing rings.

It is another object of the present invention to provide a vacuum flange connection capable of employing both reusable O-rings and shear deformed non-reusable sealing rings.

A further object of the present invention is the provision of a versatile vacuum flange for receiving either bakable or non-bakable sealing rings.

These and other objects and many of the attendant advantages of the present invention will be readily appreciated and better understood as the following detailed description is considered in connection with the accompanying drawing in which.

Figure 1:
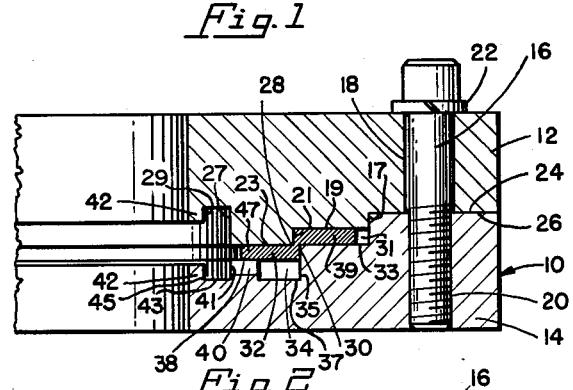
FIG. 1 is a side sectional view of a portion of the versatile vacuum flange of the present invention employing a shear seal metallic sealing ring.
Figure 2:
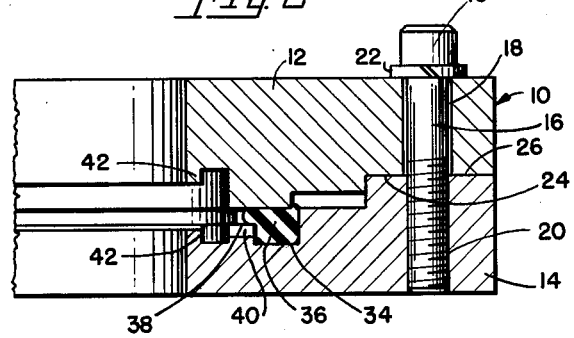
FIG. 2 is a side sectional view of a portion of the versatile vacuum flange of this invention employing a conventional O-ring seal.
Figure 3:
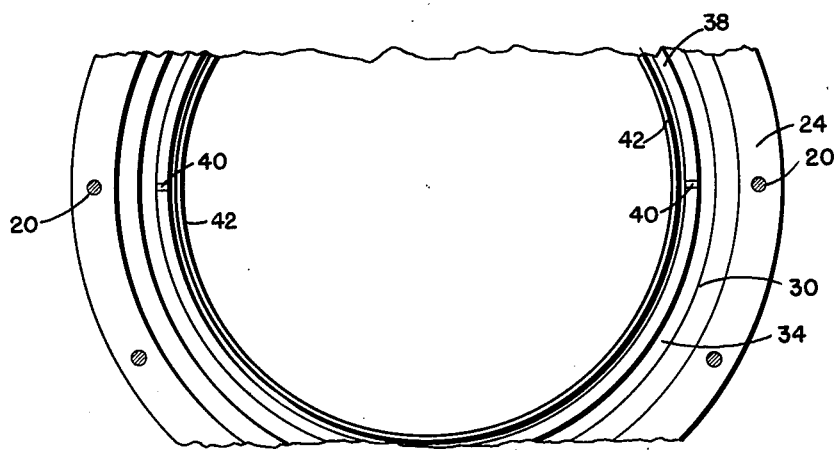
FIG. 3 is a top view of a portion of the female member of the vacuum flange of the present invention.

Referring now in detail to the drawings, wherein like reference characters represent like parts throughout the several views, and more particularly to FIGS. 1 and 2, there are shown sectional side views of a portion of the versatile vacuum flange of the present invention generally designated 10. The vacuum flange 10 comprises an annular male or upper body portion 12 and an annular female or lower body portion 14. As indicated in the illustrated embodiment the male and female body portions 12 and 14 are adapted to be secured together in axial alignment by a plurality of bolts 16 which pass through a plurality of openings 18 in male body member 12 and are threadably recieved by an equal number of complementary threaded openings 20 in female body member 14. Lock washers 22 are supplied to each bolt 16 to insure the maintenance of sufficient pressure on the seal to obviate the possibility of any leaking in the system. Of course, many other methods of securing body members 12 and 14 together may be employed without departing from the scope of the present invention.

When the two body members 12 and 14 are secured together as shown in FIGS. 1 and 2, shoulder 24 on male portion 12 abuts shoulder 26 on female portion 14 thus fixing the relationships of the annular shearing edge 28 of male member 12 and the annular shearing edge 30 of female member 14. This relationship should be such that the radial space separating the two shearing edges is approximately one-half the thickness of the metal, washer-shaped sealing ring 32 employed as the bakable seal.

The female body member is also provided with an O-ring seat 34 for receiving a standard non-bakable O-ring 36 of Teflon, rubber or similar material. The inner wall of the O-ring seat 34 is formed by a support shoulder 38 which acts as a support for the inner end of metal sealing ring 32 and maintains the inner half of sealing ring 32 parallel with the outer half of said ring thus insuring a proper seal at the point of shear between edges 28 and 30.

The female body member 14 is also provided with a pair of vent slots 40 which permit the venting of O-ring seat 34 when the metal sealing ring is employed and also provides for the venting of any trapped gas under or around the inner half of O-ring 36 when a non-bakable seal is employed.

Each of body portions 12 and 14 have at their inner peripheries a welding lip 42 which is substantially the same thickness as the conduit to be attached to the flange. The use of this welding lip considerably reduces the amount of heat which must be applied to the flange when the conduit is welded thereto, preferably by a heliarc process. It should be noted that when body portions 12 and 14 are secured together by tightening bolts 16 the welding lips 42 of each body member are spaced from each other. This space along with venting or bleeding slots 40 permits all areas inwardly of the actual points of sealing contact between the respective body portions and the sealing ring employed, regardless of which sealing ring is selected, to be in communication with the interior of the vacuum system thus eliminating the possibility of slow out gassing from these areas. Accordingly, the initial attainment of the desired vacuum is accomplished and subsequent virtual leaks from trapped gasses are eliminated.

More specifically the male and female members are formed as follows: The male member is provided with a shoulder 24 that has openings 18 therein through which the bolts 16 pass to secure the male member to female member 14. Shoulder 24 extends radially inward to a step riser portion 17 that extends axially to a radially inward extending step 19. Step 19 extends radially inward to an axially extending step riser portion 21 that extends axially to a radially inward step 23. Step 23 and step riser portion 21 intercepts to form shearing edge 28. An annular groove 25 having inner and outer axially extending walls 27 and 29 is formed radially outward of welding lip 42 with the outer wall 27 intercepting with the radially extending step 23. The wall 29 is shorter in length than wall 27 such that welding lip 42 does not extend axially as much as the step 23.

The female member is provided with a shoulder 26 through which threaded openings 20 pass to receive the threaded ends of bolts 16 thereby securing the male member thereto in axial alignment. Shoulder 26 extends radially inward for a slightly less distance than shoulder 24 on male member 12 to a step riser portion 31 such that the step riser portion 31 fits along side step riser portion 17 of the male member with a close fit during assembly. The step riser portion 31 extends axially to a radially inward extending step 33. Step 33 intercepts with an axially extending wall 35 of an annular groove 37 at shearing edge 30. The shearing edge 30 has a radial distance which is slightly greater than the radial distance of shearing edge 28 such that the radial difference in the radial distance between shearing edges 30 and 28 is approximately one-half the axial spacing between step 33 on the female member and step 19 on the male member when the two members are assembled. The annular groove 37 forms the O-ring seat 34. An inner wall 39 of the annular groove 37 intercepts support shoulder 38 which extends radially inward to the outer, axially, extending wall 41 of annular groove 43. The inner axially extending wall 45 of annular groove 43 intercepts with the welding lip 42 on the female member. Thus, the inner annular groove 43 is just radially outwardly of the welding lip 42. The support shoulder 38 acts as a support for the inner end of a metal sealing ring 32 and compresses the inner end 47 of the metal seal ring between shoulder 38 and step 23 on the male member when the male and female members are secured together as shown in FIG. 1. The outer end of the metal seal ring is pressed between step 19 on the male member and step 33 on the female member.

When it is desired to put a vacuum system into operational use it is necessary to pretest the system for leaks. This may be repeated several times while the various leaks are detected and sealed off as they are found. In a system which will be or may be baked, one where a vacuum in the $10^{-10}$ millimeters of mercury range is contemplated, it is necessary to use metal sealing rings which can withstand temperatures in the 400–500° C. range. Since each time one of these metal sealing rings is sheared it cannot be reused, a comparatively large number are expended in the sealing, opening and resealing operation that accompanies the leak checking of the system. The male and female members also must be tightly secured by bolts 16 each time to cause the shearing required to provide the seal when the metal ring is used. By using a rubber or Teflon O-ring during the leak testing process, no sealing rings are expended and only the tightening of a few bolts 16 is required to produce a seal. After the leak testing process is completed the rubber O-ring can be replaced by a metal sealing ring and the system baked. Of course, where it is not intended that the system be baked or if only a low temperature bake-out is necessary the rubber O-ring may be employed throughout both the leak testing and operation of the system, thus eliminating the necessity of using a non-reusable seal.

The versatile vacuum flange of the present invention is adapted to employ both reusable rubber or Teflon O-rings and also bakable shear type metal sealing rings in a single flange connection and thus eliminates the destruction of numerous shear type sealing rings in the leak testing process. It further provides for a unique interrelationship of seats for both the rubber and metal sealing rings whereby regardless of which seal is employed, the area between the flange body portions lying inwardly of the actual sealing points can be evacuated and completely purged of potential virtual leak sources during the evacuation of the remainder of the system.

Obviously many variations and modifications of the present invention are possible in light of the foregoing description. It is therefore to be understood that the scope of this invention is to be limited only by the appended claims and not otherwise.

What is claimed is:

1. A flange for use in a vacuum system and adapted to interchangeably accommodate either metal shear type or standard O-ring sealing rings comprising:
   a female body portion having an axial passage therethrough,
   a male body portion having an axial passage therethrough the same as the passage through said female body portion,
   means for tightly securing said male body portion to said female body portion in axial alignment,
   said female and male body portions forming a metal seal ring seat and an O-ring seal seat axially between said body portions when tightly secured together,
   said metal seal ring seat being formed axially between first and second radially extending step portions on said male body portion and first and second radially extending step portions on said female body portion, respectively,
   a first shearing edge located on said male member on the outer axial edge of said second step portion,
   a second shearing edge located on said female member on the inner radial edge of said first step portion,
   an annular groove in said female portion radially between said second and first step portions thereof axially opposite a portion of said second step portion on said male portion,
   said annular groove forming an O-ring seat axially between said male and female members when secured together.

2. A flange for use in a vacuum system and adapted to interchangeably accommodate either metal shear type or standard O-ring sealing rings comprising:
   a famale body portion having an axial passage therethrough,
   a male body portion having an axial passage therethrough the same as the passage through said female body portion,
   means for tightly securing said male body portion to said female body portion in axial alignment,
   said female and male body portions forming a metal seal ring seat and an O-ring seal seat axially between said body portions when tightly secured together,
   said metal seal ring seat being formed axially between first and second radially extending step portions on said male body portion and first and second radially extending step portions on said female body portion, respectively,
   a first shearing edge located on said male member on the outer axial edge of said second step portion,
   a second shearing edge located on said female member on the inner radial edge of said first step portion,
   said second shearing edge having a greater radii than said first shearing edge and lying approximately in the same plane when said body portions are secured together, with the plane perpendicular to the axis of said flange,
   the difference in the radii of said second shearing edge and said first shearing edge being approximately equal to one-half the axial spacing between said first and second steps on said male and female portions at the metal seal shearing ring seat, and an annular groove in said female portion radially between said second and first step portions thereof axially opposite a portion of said second step portion on said male portion, said annular groove forming an O-ring seat axially between said male and female members when secured together.

3. A vacuum flange as claimed in claim 2 wherein:

said female body portion includes a radially extending air vent slot between said annular groove and the inner wall surface.

4. A vacuum flange as claimed in claim 3 which includes:

a welding lip adjacent the inner surface of each of said male and female portions for facilitating the welding of said flange portions to a conduit, said welding lips being spaced axially from each other when said portions are secured together.

References Cited by the Examiner

UNITED STATES PATENTS

| | | | |
|---|---|---|---|
| 1,965,273 | 7/1934 | Wilson | 285—363 X |
| 2,061,198 | 11/1936 | Kohut | 285—363 X |
| 2,118,671 | 5/1938 | Green. | |
| 2,446,481 | 8/1948 | Letterman | 285—416 X |
| 2,783,295 | 2/1957 | Ewing | 285—363 |
| 2,834,097 | 5/1958 | Eichenberg | 285—416 X |
| 2,922,666 | 1/1960 | Lange | 285—363 X |
| 3,137,317 | 6/1964 | Peters. | |

FOREIGN PATENTS 793,236   11/1935   France.

CARL W. TOMLIN, *Primary Examiner.*